(12) United States Patent
Naito et al.

(10) Patent No.: US 11,572,491 B2
(45) Date of Patent: Feb. 7, 2023

(54) ADHESIVE FOR HEAT PRESS MOLDING, WOODEN BOARD, AND MANUFACTURING METHODS THEREOF

(71) Applicant: Panasonic Intellectual Property Management Co., Ltd., Osaka (JP)

(72) Inventors: Shigeki Naito, Hyogo (JP); Yoshio Ueyama, Wakayama (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 808 days.

(21) Appl. No.: 16/486,829

(22) PCT Filed: Feb. 15, 2018

(86) PCT No.: PCT/JP2018/005174
§ 371 (c)(1),
(2) Date: Aug. 17, 2019

(87) PCT Pub. No.: WO2018/155292
PCT Pub. Date: Aug. 30, 2018

(65) Prior Publication Data
US 2020/0190366 A1    Jun. 18, 2020

(30) Foreign Application Priority Data

Feb. 24, 2017 (JP) .............................. JP2017-033854
Jun. 20, 2017 (JP) .............................. JP2017-120628

(51) Int. Cl.
| | |
|---|---|
| C09J 7/00 | (2018.01) |
| C09J 7/35 | (2018.01) |
| C09J 7/38 | (2018.01) |
| B27N 3/02 | (2006.01) |
| B27N 3/08 | (2006.01) |
| C09J 105/00 | (2006.01) |
| C09J 201/08 | (2006.01) |
| C08K 5/092 | (2006.01) |
| C08K 5/19 | (2006.01) |
| C08L 71/02 | (2006.01) |
| C08L 91/06 | (2006.01) |
| D21J 1/04 | (2006.01) |
| C08L 97/02 | (2006.01) |
| C09J 11/04 | (2006.01) |
| B27N 3/00 | (2006.01) |
| C09J 11/08 | (2006.01) |

(52) U.S. Cl.
CPC ............... *C09J 7/35* (2018.01); *B27N 3/02* (2013.01); *B27N 3/08* (2013.01); *C09J 7/38* (2018.01); *C09J 105/00* (2013.01); *C09J 201/08* (2013.01); *B27N 3/002* (2013.01); *C08K 5/092* (2013.01); *C08K 5/19* (2013.01); *C08L 71/02* (2013.01); *C08L 91/06* (2013.01); *C08L 97/02* (2013.01); *C09J 11/04* (2013.01); *C09J 11/08* (2013.01); *C09J 2400/30* (2013.01); *C09J 2400/306* (2013.01); *C09J 2405/00* (2013.01); *D21J 1/04* (2013.01)

(58) Field of Classification Search
None
See application file for complete search history.

(56) References Cited

U.S. PATENT DOCUMENTS

| | | | | |
|---|---|---|---|---|
| 2,768,096 | A * | 10/1956 | Toulmin, Jr. | C09J 7/21 106/217.7 |
| 4,107,379 | A | 8/1978 | Stofko | |
| 6,613,378 | B1 * | 9/2003 | Erhan | C09J 105/00 106/205.1 |
| 2007/0027283 | A1 | 2/2007 | Swift | |
| 2007/0123679 | A1 | 5/2007 | Swift | |
| 2007/0123680 | A1 | 5/2007 | Swift | |
| 2007/0142596 | A1 | 6/2007 | Swift | |
| 2010/0222463 | A1 * | 9/2010 | Brady | D06M 15/03 524/27 |
| 2011/0174191 | A1 | 7/2011 | Umemura | |
| 2013/0253160 | A1 | 9/2013 | Tapsak | |
| 2014/0011042 | A1 * | 1/2014 | Sugawara | C09J 105/00 106/217.7 |
| 2018/0155583 | A1 * | 6/2018 | Kakuda | C08K 3/16 |

FOREIGN PATENT DOCUMENTS

| | | | |
|---|---|---|---|
| CN | 102408848 | A * | 4/2012 |
| GB | 2142943 | A | 1/1985 |
| JP | S56-500414 | A | 4/1981 |
| JP | S60-30309 | A | 2/1985 |
| JP | H08-41437 | A | 2/1996 |
| JP | 3796604 | B2 | 4/2006 |
| JP | 2009-503193 | A | 1/2009 |
| JP | 2012-214687 | A | 11/2012 |
| JP | 2014-051568 | A | 3/2014 |
| WO | 80/01891 | A1 | 9/1980 |
| WO | 2009/019235 | A1 | 2/2009 |

(Continued)

OTHER PUBLICATIONS

CN-102408848-A—English translation (Year: 2012).*
Extended European Search Report for corresponding Application No. 18758309.1, dated Jan. 9, 2020.
International Search Report for corresponding Application No. PCT/JP2018/005174, dated Mar. 27, 2018.
Written Opinion for corresponding Application No. PCT/JP2018/005174, dated Mar. 27, 2018.

(Continued)

*Primary Examiner* — Stefanie J Cohen

(74) *Attorney, Agent, or Firm* — Renner, Otto, Boisselle & Sklar, LLP

(57) ABSTRACT

An adhesive for heat press molding contains a reaction product obtained by heat treatment on a mixture containing a polycarboxylic acid and a saccharide.

3 Claims, No Drawings

(56) References Cited

FOREIGN PATENT DOCUMENTS

| WO | 2010/001988 A1 | 1/2010 |
|----|----------------|--------|
| WO | 2011/015946 A2 | 2/2011 |
| WO | 2011/022668 A1 | 2/2011 |

OTHER PUBLICATIONS

"Wooden New Materials Handbook", Gihodo Shuooan Co., Ltd., p. 361 (Discussed in Specification).
"Advanced Technologies for Chemicals from Wooden Resources", CMC Publishing Co., Ltd, p. 225 (Discussed in Specification).
Office Action for corresponding European Patent Application No. 18758309.1, dated Mar. 3, 2020.
Azeredo Henriette M C et al: Development of pectin films with pomegranate juice and citric acid, Food Chemistry, Elsevier Ltd., NL, vol. 198 (Nov. 6, 2015) pp. 101-106, XP029379544.

* cited by examiner

ADHESIVE FOR HEAT PRESS MOLDING, WOODEN BOARD, AND MANUFACTURING METHODS THEREOF

TECHNICAL FIELD

The present disclosure generally relates to adhesives for heat press molding, wooden boards and manufacturing methods thereof, and especially relates to an adhesive for heat press molding which can be used as a material of a wooden board, a wooden board, and manufacturing methods thereof.

BACKGROUND ART

In recent years, as interests in environmental problems such as Global warming are increasing, more attentions are paid on resins obtained by polymerizing a decomposed material derived from plants which is low in emission and carbon neutral as substitutes for petroleum-based materials in a technical field of plastic. Among these, a polylactic acid obtained by polymerizing a lactic acid which is one kind of a decomposed material derived from plants has a crystalline property and good properties compared to other resin derived from plants, can be manufactured in large quantities with a relatively low cost, and therefore considered useful. However, since a polylactic acid is a thermoplastic resin and has low heat resistancy and low mechanical properties compared to general petroleum-based thermoplastic resins (such as polyethylene (PE), polypropylene (PP), and acrylonitrile butadiene styrene copolymer (ABS)), a polylactic acid is not widely used. Also, a polylactic acid does not have properties which are satisfactory enough to be used as a substitute for a petroleum-based thermosetting resin adhesive.

Originally, adhesives derived from biomass such as casein, a soy glue, or a Nikawa glue were mainly used as the adhesive for wooden materials; however, since properties of such adhesives were inferior, these adhesives had been substituted by petroleum-based thermosetting resin adhesives such as urea resin, melamine resin, or a phenol resin. These petroleum-based thermosetting resin adhesives are used to bond small wooden pieces and to manufacture wooden boards such as plywood, particle boards, or fiber boards.

General adhesive for wooden materials (such as urea resin-based adhesives, melamine resin-based adhesives, or phenol resin-based adhesives) are derived from petroleum and contains formaldehyde as a curing agent. These adhesive for wooden materials are need to be aqueous in order to prevent diffusion of an organic solvent. When using these adhesives, there exists a problem of the diffusion of formaldehyde. The diffusion of formaldehyde is tried to be reduced, but it is difficult to prevent the diffusion of formaldehyde completely.

Isocyanate-based adhesives originating in petroleum which are free from the diffusion of formaldehyde are being developed, but there still remain problems of reactivity with moisture and bonding with metals, which prevents wide use of the isocyanate-based adhesives originating in petroleum.

On the other hand, since tannin and/or lignin which are polyphenols contained in wooden materials and bark are treated as wastes in use of lumber and pulp, there had been attempts to effectively utilize tannin and/or lignin for a long time. For example, since tannin and/or lignin are similar to phenol resins in structures, it had been investigated to use a polymerization product obtained by a reaction of tannin and/or lignin with formaldehyde as an adhesive (Patent Literature 1). Further, it had been investigated to taking tannin and/or lignin into a polymer backbone of a phenol resin by adding tannin and/or lignin to a phenol resin, with an expectation of a reaction of a methylol group in a phenol resin with tannin and/or lignin (Non-Patent Literatures 1 and 2).

There had been another attempt to effectively utilize tannin and/or lignin. In this attempt, it is investigated to obtain a urethane resin by reaction a phenolic hydroxyl group in tannin and/or lignin with a polyisocyanate.

However, when reacting tannin and/or lignin using formaldehyde, there exists a problem that remained formaldehyde or formaldehyde generated by hydrolysis might diffuse. Also, since the reactivities of tannin and lignin are lower than the reactivity of a conventional phenol resin, properties and productivities become inferior to cases where a conventional phenol resin is used. Therefore, this technique is not widely used.

In these circumstances, it is proposed to manufacture a wooden board made of small wooden pieces by using an adhesive whose main components are a polycarboxylic acid and a saccharide (Patent Literatures 2 to 4). In the Patent Literature 3, it is proposed to further add paratoluene sulfonic acid, a phosphate, and an organic titanium compound as a catalyst.

When a wooden board used for, for example, as a floor material is manufactured by using adhesives disclosed in the above Patent Literatures 2 to 4, the polycarboxylic acid and the saccharide, and additives such as a catalyst if necessary, are directly mixed with and dispersed in raw materials of the wood board such as small wooden pieces, which is then heat press molded to obtain the wooden board.

However, since the adhesives disclosed in the Patent Literatures 2 to 4 take a long time for a reaction to proceed and for molding, there had been existing possibilities in improvements in the reaction time and the molding time and more reactive adhesives had been desired.

CITATION LIST

Patent Literature

Patent Literature 1: JP3796604B2
Patent Literature 2: WO2010/001988A1
Patent Literature 3: JP2012-214687A
Patent Literature 4: JP2014-51568A

Non-Patent Literature

Non-Patent Literature 1: p. 361 of "Wooden New Materials Handbook" published by GIHODO SHUPPAN Co., Ltd.
Non-Patent Literature 2: p. 225 of "Advanced Technologies for Chemicals from Wooden Resources" published by CMC Publishing CO., LTD.

SUMMARY OF INVENTION

The present disclosure aims to provide an adhesive for heat press molding which can be used to manufacture a wooden board having a water resistancy high enough for practical use without a decrease in bending strength, a wooden board, and manufacturing methods thereof.

An adhesive for heat press molding according to one embodiment of the present disclosure contains a reaction product obtained by heat treatment on a mixture containing a polycarboxylic acid and a saccharide.

A wooden board according to one embodiment of the present disclosure is obtained by heat press molding of a mixture containing the adhesive for heat press molding and an aggregation of small wooden pieces.

A manufacturing method of an adhesive for heat press molding according to one embodiment of the present disclosure includes a first step and a second step. In the first step, a mixture is obtained by mixing a polycarboxylic acid and a saccharide. In the second step, a reaction product is obtained by heat treatment on the mixture. The first step and the second step are carried out in this order.

In a manufacturing method of a wooden board according to one embodiment of the present disclosure, a wooden board is obtained by mixing and heat press molding the adhesive for heat press molding obtained by the manufacturing method of an adhesive for heat press molding and an aggregation of small wooden pieces.

DESCRIPTION OF EMBODIMENTS

An adhesive for heat press molding of the present embodiment contains a reaction product obtained by heat treatment on a mixture containing a polycarboxylic acid and a saccharide.

The polycarboxylic acid used in the adhesive for heat press molding of the present embodiment is not especially limited as long as the polycarboxylic acid has multiple carboxyl groups. Examples of the polycarboxylic acid may include citric acid, tartaric acid, malic acid, succinic acid, oxalic acid, adipic acid, malonic acid, phthalic acid, sebacic acid, maleic acid, fumaric acid, and itaconic acid. Examples of the polycarboxylic acid also may include glutaric acid (1,5-pentanedioic acid), gluconic acid, glutaconic acid, and pentenedioic acid. Furthermore, anhydrides of the above exemplified polycarboxylic acids may also be used.

Among the above exemplified polycarboxylic acids, citric acid, tartaric acid, malic acid, gluconic acid, sebacic acid, and itaconic acid are derived from plants and therefore can be more suitably used. Since citric acid, tartaric acid, malic acid, gluconic acid, sebacic acid, and itaconic acid are derived from plants, used of fossil resources can be reduced, and thus the adhesive for heat press molding can be obtained without adversely affecting environments. The above exemplified polycarboxylic acids may be used alone or in combination. Note that a polycarboxylic acid may also be noted generally as a polyvalent carboxylic acid.

The saccharide includes a monosaccharide, a disaccharide in which two monosaccharides are bonded by a glycosidic bond, an oligosaccharide, and a polysaccharide. Examples of the monosaccharide may include fructose, ribose, arabinose, rhamnose, xylulose, and deoxyribose. Examples of the disaccharide may include sucrose, maltose, trehalose, turanose, lactulose, maltulose, palatinose, gentiobiulose, melibiulose, galactosucrose, rutinulose, and planteobiose. Examples of the oligosaccharide may include fructooligosaccharide, gal actooligosaccharide, mannanoligosaccharide, and stachyose. Examples of the polysaccharide may include starch, agarose, alginic acid, gucomannan, inulin, chitin, chitosan, hyaluronic acid, glycogen, and cellulose. The above exemplified saccharides may be used alone or in combination.

In the adhesive for heat press molding of the present embodiment, a pre-reaction is carried out by heating a mixture containing the polycarboxylic acid and the saccharide. In this heat treatment, the saccharide first reacts with the polycarboxylic acid and is hydrolyzed, leading to formation of a hydrolysis product. Then, the hydrolysis product is further dehydrated and condensed into a reaction product which is a saccharide-modified compound. The maximum temperature of heating in the heating treatment is preferably 180° C. and more preferably 150° C., and the minimum temperature of heating is preferably 80° C. and more preferably 100° C. When the temperature of heating is too high, it becomes difficult to control completion of a first reaction to be explained below. When the temperature of heating is too low, reaction time elongates, leading to lowering of productivity. The maximum reaction time of heating in the heating treatment is preferably 120 minutes, and the minimum reaction time of heating is preferably 10 minutes.

Also, in the adhesive for heat press molding of the present embodiment, the polycarboxylic acid is preferably citric acid, and the saccharide is preferably sucrose. When using citric acid as the polycarboxylic acid and sucrose as the saccharide for the heating treatment, the reaction product as illustrated in the reaction formula below is assumed to be produced.

[Chemical formula 1]

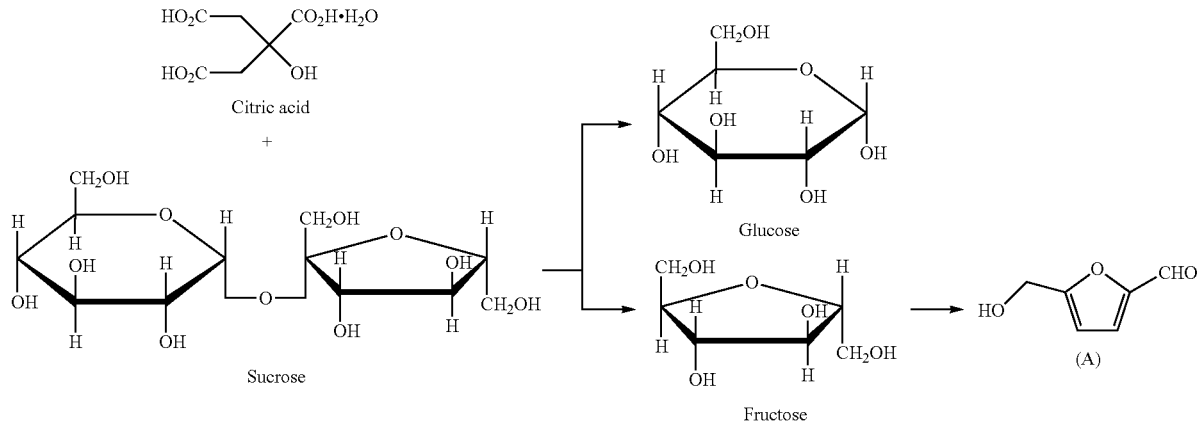

When the heating treatment is carried out in a mixture containing citric acid and sucrose, sucrose is first hydrolyzed into glucose and fructose. Then fructose is dehydrated into 5-(hydroxy methyl) furfural which is the reaction product.

Note that citric acid after the heat treatment is considered to be not predominantly modified and remains as citric acid.

In other words, a main component of the adhesive for heat press molding of the present embodiment is the reaction product including the polycarboxylic acid which went through the first step reaction of the heating treatment and the saccharide-modified compound. The adhesive for heat press molding of the present embodiment is water soluble and exhibits thermoplasticity. Amounts of the polycarboxylic acid and the saccharide are not especially limited.

In a case where at least one of ammonium sulfate and ammonium chloride is not added to the reaction product after the heat treatment as explained later, the maximum amount of the polycarboxylic acid with respect to a total amount of the adhesive for heat press molding is preferably 80 weight % and more preferably 75 weight %. The minimum amount of the polycarboxylic acid with respect to the total amount of the adhesive for heat press molding is preferably 20 weight % and more preferably 32 weight %. In this case, the maximum amount of the saccharide with respect to the total amount of the adhesive for heat press molding is preferably 80 weight % and more preferably 60 weight %. The minimum amount of the saccharide with respect to the total amount of the adhesive for heat press molding is preferably 20 weight % and more preferably 25 weight %.

In a case where at least one of ammonium sulfate and ammonium chloride is added to the reaction product after the heat treatment as explained later, the amount of the polycarboxylic acid with respect to the total amount of the adhesive for heat press molding is preferably around 0.1 weight %. In this case, the maximum amount of the saccharide with respect to the total amount of the adhesive for heat press molding is preferably 98 weight % and the minimum amount of the saccharide with respect to the total amount of the adhesive for heat press molding is preferably 89 weight %.

In the adhesive for heat press molding of the present embodiment, the mixture containing the polycarboxylic acid and the saccharide preferably further contains at least one of ammonium sulfate and ammonium chloride. Ammonium sulfate and ammonium chloride can be added to the mixture as a reaction catalyst in order to facilitate an esterification reaction between a hydroxyl group in a small wooden piece which is a material of a wooden board and the polycarboxylic acid when the wooden board is manufactured.

In general, the esterification reaction between the polycarboxylic acid and a hydroxyl group in the small wooden piece proceed relatively slowly, taking time. Due to this, adding at least one of ammonium sulfate and ammonium chloride as a catalyst can shorten the reaction time of the esterification reaction.

An amount of the at least one of ammonium sulfate and ammonium chloride is not especially limited. The maximum amount of the at least one of ammonium sulfate and ammonium chloride with respect to the total amount of the adhesive for heat press molding is preferably 20 weight %, more preferably 12 weight %, and further preferably 10 weight %. In a case were the amount of the catalyst is equal to or under the above maximum amount, the reaction time of the esterification reaction can be more shortened and water resistancy of the wooden board can be improved. Note that strength of the wooden board is not affected since the catalyst as explained above is a salt which is relatively weakly acidic.

In the adhesive for heat press molding of the present embodiment, the mixture containing the polycarboxylic acid and the saccharide preferably further contains a dispersant. The dispersant is not especially limited, but a wax or a polyether can be preferably used as the dispersant. Examples of the wax may include a paraffin-based wax. Examples of the polyether may include polyethylene glycol and polypropylene glycol.

An amount of the dispersant is not especially limited. The maximum amount of the dispersant with respect to a total amount of the mixture is preferably 5 weight %, more preferably 3 weight %, and further preferably 2 weight %. The minimum amount of the dispersant with respect to the total amount of the mixture is preferably 0.1 weight % and more preferably 0.5 weight %. Adding the dispersant to the mixture decreases viscosity of the mixture during a reaction by the heat treatment, which facilitates polymerization (dehydration condensation) and prevents stickiness of the reaction product after the reaction. Due to this, when the adhesive for heat press molding is pulverized, dispersibility of pulverized powder of the adhesive is improved, leading to improved handleability of the adhesive.

Furthermore, in the adhesive for heat press molding of the present embodiment, at least one of ammonium sulfate and ammonium chloride is preferably added to the reaction product after the heat treatment. Also, at least one of ammonium sulfate and ammonium chloride can be contained in the mixture, and at the same time at least one of ammonium sulfate and ammonium chloride can be added to the reaction product after the heat treatment. Other than the at least one of ammonium sulfate and ammonium chloride, citric acid and/or para-toluene sulfonic acid may be added to the reaction product after the heat treatment. Especially in a case where the mixture does not contain either ammonium sulfate nor ammonium chloride or in a case where an amount of the at least one of ammonium sulfate and ammonium chloride in the mixture is small, adding citric acid and/or para-toluene sulfonic acid can prevent the stickiness of the reaction product generated from the mixture containing the polycarboxylic acid and the saccharide and the obtained adhesive for heat press molding can be pulverized.

An amount of a catalyst added to the reaction product after the heat treatment is not especially limited. The maximum amount of the catalyst added to the reaction product after the heat treatment with respect to a total amount of the reaction product and the catalyst added to the reaction product is preferably 40 weight %, more preferably 30 weight %, and further preferably 25 weight %. The minimum amount of the catalyst added to the reaction product after the heat treatment with respect to a total amount of the reaction product and the catalyst added to the reaction product is preferably 5 weight % and more preferably 10 weight %. In a case where the catalyst is added to the reaction product after the heat treatment, the adhesive for heat press molding can be easily pulverized and the handleability of the adhesive can be improved. Note that when at least one of ammonium sulfate and ammonium chloride is added to the reaction product obtained by the heat treatment, the amount of the at least one of ammonium sulfate and ammonium chloride added before the heat treatment for the reaction between the polycarboxylic acid the saccharide with respect to the total amount of the mixture is preferably 3 weight % or less, which facilitates pulverization of the adhesive for heat press molding.

The second step reaction proceeds and curing is completed by mixing an aggregation of small wooden pieces with the adhesive for heat press molding of the present embodiment after the completion of the first step reaction by the heat treatment or after addition of the catalyst to the product obtained by the heat treatment and by further heating thereof. Specifically, for example, furfural which is the saccharide-modified compound is turned into a furan resin which is a thermosetting resin by further heating and cures under the existence of the polycarboxylic acid. Glucose is turned into a sugar ester polymer by a dehydration condensation reaction, which is then filled into spaces within the aggregation of small wooden pieces and cured. A curing product generated from the saccharide-modified compound has a relatively large molecular weight and thus functions as a tough auxiliary bond. On the other hand, the polycarboxylic acid cures firmly in a relatively low molecular weight state by the esterification reaction with a hydroxyl group in the small wooden piece. In other words, when manufacturing the wooden board using the adhesive for heat press molding of the present embodiment, two kinds of different curing reactions of the reaction product of the saccharide-modified compound and the polycarboxylic acid make it possible to manufacture the wooden board having the water resistance high enough for practical use with little decrease in the bending strength. Especially in a case where the wooden board is manufactured by adding at least one of ammonium sulfate and ammonium chloride to the reaction product obtained by the heat treatment, the curing reaction is accelerated, and the wooden board excellent in the bending strength and the water resistancy can be manufactured.

Also, the adhesive for heat press molding of the present embodiment does not contain any organic solvent or formaldehyde within its reaction system, and also does not contain a compound such as a tertiary amine which generates formaldehyde by decomposition. Due to this, diffusions of the organic solvent and formaldehyde originated in the adhesive can be prevented. Also, since the polycarboxylic acid and the saccharide which are generally available are used as the materials, manufacturing cost can be lowered.

The adhesive for heat press molding of the present embodiment may contain other components such as a thickener and a reaction accelerator as long as the effects of the present embodiment are not inhibited. Also, the catalyst for the esterification reaction is not limited to at least one of ammonium sulfate and ammonium chloride, and other catalysts such as para-toluene sulfonic acid may be used in addition to at least one of ammonium sulfate and ammonium chloride.

The adhesive for heat press molding of the present embodiment preferably contains wood powder and is preferably in a form of pulverized powder. The wood powder may be added to the mixture containing the polycarboxylic acid and the saccharide, and the obtained adhesive after heat treatment, cooling, and solidification may be pulverized. Also, the finely pulverized wood powder may be added to and mixed with the aqueous solution of the reaction product of the polycarboxylic acid and the saccharide-modified compound after the heat treatment, which can be then dried. In a case where the wood powder is mixed with the mixture, the maximum amount of the wood powder with respect to the total amount of the mixture is preferably 80 weight %. In this case, the minimum amount of the wood powder with respect to the total amount of the mixture is preferably 50 weight %. In a case where the wood powder is mixed with the aqueous solution of the reaction product, the maximum amount of the wood powder with respect to a total amount of the adhesive for heat press molding after drying is preferably 90 weight % and more preferably 80 weight %. In this case, the minimum amount of the wood powder with respect to a total amount of the adhesive for heat press molding after drying is preferably 20 weight % and more preferably 50 weight %.

Examples of the wood powder may include powder containing a thinned wood material and a building demolition material as a main component. Examples of the thinned wood material may include wood powder in which a coniferous tree such as pine, cedar, and Japanese cypress called hinoki or a hardwood such as lauan, kapur, and polar is pulverized. Also, the examples of the building demolition material may include wood powder in which a waste material of a wooden board such as wooden plywood, a particle board, a medium density fiber board, and an oriented strand board is pulverized. Further, waste of agricultural products such as bamboo and chaff can be cut and grinded, and used appropriately as the wood powder. The above exemplified wood powders may be used alone or in combination. When the wood powder is contained in the adhesive for heat press molding, the adhesive for heat press molding can have improved dispersibility in the aggregation of small wooden pieces which is the material of the wooden board. The maximum particle size of the wood powder is preferably 200 μm and more preferably 100 μm. The minimum particle size of the wood powder is preferably 1 μm and more preferably 10 μm.

Furthermore, in the adhesive for heat press molding of the present embodiment, the adhesive for heat press molding can be in a form of an aqueous solution. The adhesive for heat press molding can be turned into an aqueous solution by mixing the adhesive for heat press molding in a melting condition after the heat treatment with water or by mixing the adhesive for heat press molding after cooling and solidification with water. Note that the adhesive for heat press molding in a form of an aqueous solution molding means that at least the reaction product of the polycarboxylic acid and the saccharide is dissolved or uniformly dispersed in water. A concentration of the reaction product in the aqueous solution of the adhesive for heat press molding is not especially limited as long as the concentration is within a range with which the adhesive for heat press molding is even and uniform, the adhesive is less likely to over permeate, a temperature rise when curing the adhesive by heating is less likely to be slow due to evaporation, and curing is likely to be thorough. The maximum concentration of the reaction product with respect to a total amount of the aqueous solution of the adhesive for heat press molding is preferably 80 weight %. The minimum concentration of the reaction product with respect to a total amount of the aqueous solution of the adhesive for heat press molding is preferably 5 weight %. Examples of a method of mixing the aqueous solution of the adhesive for heat press molding and the aggregation of small wooden pieces may include a method in which the aqueous solution of the adhesive for heat press molding is sprayed on the aggregation of small wooden pieces by a spray and a method in which the aggregation of small wooden pieces is impregnated with the aqueous solution of the adhesive for heat press molding. By using the adhesive for heat press molding in a form of an aqueous solution, it becomes easier to mix the adhesive for heat press molding with the aggregation of small wooden pieces which is the adherend. Also, since organic solvents are not required, safety to human bodies is increased.

The wooden board of the present embodiment is obtained by heat press molding of a mixture containing the adhesive for heat press molding and the aggregation of small wood pieces. The maximum thickness of the wooden board is preferably 30 mm and more preferably 15 mm. The minimum thickness of the wooden board is preferably 1 mm and more preferably 2 mm. The wooden board is manufactured by using the adhesive for heat press molding of the present embodiment in a way that the adhesive for heat press molding is provided in the aggregation of small wooden pieces which is the material of the wooden board. The maximum amount of the adhesive is preferably 40 weight % and more preferably 30 weight %. The minimum amount of the adhesive is preferably 5 weight % and more preferably 10 weight %. The amount of the adhesive means an amount of the adhesive for heat press molding with respect to a total amount of a mixture of the adhesive for heat press molding and the small wooden chips.

In the heat press molding, conditions such as a molding pressure, a molding temperature, and a molding time are set appropriately depending on a kind of the small wooden piece, a shape of the small wooden piece, a surface property of the small wooden piece, and a thickness of the wooden board. Considering less lowering of the properties of the wooden board, less likeliness of lowering of the reaction rate, and likeliness of thorough curing, the maximum molding temperature is preferably 230° C., and the minimum molding temperature is preferably 110° C. Considering the improvement in the strength of the wooden board by strongly bonding the adhesive for heat press molding and the small wooden pieces which are the adherends and considering the moldability, the maximum molding pressure is preferably 4 MPa and the minimum molding pressure is preferably 0.5 MPa.

The small wooden piece which is the material of the wooden board can be obtained from a wooden part, a bark, a seed, or a leaf of plants and trees. Examples of the small wooden piece may include a wooden strand, a wooden chip, wooden fibers, plant fibers, plant powder (such as bark powder) commercially available, and a chip obtained by grinding a recycled material. Examples of the wooden board manufactured by bonding the aggregation of the above exemplified small wooden pieces using the adhesive for heat press molding of the present application may include a particle board, a fiber board, and a medium density fiber board (MDF). In a case where the small wooden piece is a wooden chip, the maximum particle size of the small wooden piece is preferably 2 mm and more preferably 1 mm. In this case the minimum particle size of the small wooden piece is preferably 100 μm and more preferably 200 μm.

Note that, in the present embodiment, in a case where the catalyst of at least one of ammonium sulfate and ammonium chloride is used, the catalyst is mixed with the polycarboxylic acid and the saccharide, which is then heat treated to obtain the adhesive for heat press molding; however, the catalyst may be dispersed in the small wooden pieces in advance.

Examples of a method for dispersing the catalyst of at least one of ammonium sulfate and ammonium chloride within the aggregation of small wooden pieces may include a method which uses an aqueous dispersion of the catalyst and a method which uses the catalyst in a powder form. Note that the aqueous dispersion of the catalyst means a solution in which the catalyst is dissolved or dispersed uniformly in water.

In the method which uses the aqueous dispersion of the catalyst, for example, an aqueous dispersion of the catalyst of at least one of ammonium sulfate and ammonium chloride and the aggregation of small wooden pieces can be mixed and then dried. In this case, a drying method is preferably air drying, but touch drying may also be employed.

Considering the acceleration of the esterification reaction between a hydroxyl group of the small wooden piece in the material and the polycarboxylic acid, a concentration of the catalyst in the aqueous dispersion of the catalyst is preferably equal to or higher that 5 weight %, with respect to a total amount of the aqueous dispersion. Examples of a method for mixing the aqueous dispersion of the catalyst and the aggregation of small wooden pieces may include a method in which the aqueous dispersion of the catalyst is sprayed on the aggregation of small wooden pieces using a spray and a method in which the aggregation of small wooden pieces is impregnated with the aqueous dispersion of the catalyst.

In the method which uses the catalyst in a powder form, the catalyst can be dispersed among the aggregation of small wooden pieces by mixing the powdery catalyst and the aggregation of small wooden pieces. Examples of a mixing method may include a method in which the powdery catalyst is placed over the aggregation of the small wooden pieces and mixing is carried out by a machine.

In a case where the adhesive for heat press molding of the present embodiment which does not contain the catalyst, the reactivity can be improved by dispersing the catalyst in the aggregation of small wooden pieces in advance.

According to the above explained adhesive for heat press molding of the present embodiment, the adhesive for heat press molding having the high reactivity can be obtained at low cost without adversely affecting environments.

Note that an adherend of the adhesive for heat press molding is not limited to small wooden pieces, and inorganic materials such as glass fibers may be used. Also, a molding shape is not limited to a board, and a product having other shapes such as a cube may be molded.

A manufacturing method of an adhesive for heat press molding according to the present embodiment includes: a first step of obtaining a mixture by mixing a polycarboxylic acid and a saccharide; and a second step of obtaining a reaction product by heat treatment on the mixture, and the first step and the second step are carried out in this order. In this manufacturing method, the adhesive for heat press molding which can be used to manufacture a wooden board having the water resistancy high enough for practical use with little decrease in the bending strength can be obtained.

In the manufacturing method of an adhesive for heat press molding according to the present embodiment, at least one of ammonium sulfate and ammonium chloride is preferably further mixed in the first step. In this manufacturing method, the adhesive for heat press molding such that the esterification reaction between a hydroxyl group in the wooden chip which is the material of the wooden board and the polycarboxylic acid can be facilitated when the wooden board is manufactured can be obtained.

The manufacturing method of an adhesive for heat press molding according to the present embodiment preferably further includes a third step of adding at least one of ammonium sulfate and ammonium chloride to the reaction product, and the third step is preferably carried out after the second step. In this manufacturing method, the adhesive for heat press molding can be easily pulverized and the handleability of the adhesive for heat press molding can be improved.

In the manufacturing method of an adhesive for heat press molding according to the present embodiment, the wood powder is preferably further mixed in the first step. In this manufacturing method, the adhesive for heat press molding having the excellent dispersibility in the aggregation of small wooden pieces which are materials of the wooden board can be obtained.

The manufacturing method of an adhesive for heat press molding according to the present embodiment preferably further includes a fourth step of adding water, and the fourth step is preferably carried out after the second step. In this manufacturing method, the adhesive for heat press molding which can be easily mixed with the aggregation of small wooden pieces which are adherends without an organic solvent can be obtained. When the manufacturing method of an adhesive for heat press molding according to the present embodiment includes the first to the fourth steps, the first step, the seconds step, the third step, and the fourth step may be carried out in this order. The first step, the seconds step, the fourth step, and the third step may be carried out in this order.

The manufacturing method of an adhesive for heat press molding according to the present embodiment preferably further includes a fifth step of adding the wood powder and evaporating water, and the fifth step is preferably carried out after the fourth step, or the fifth step is preferably carried out after the third step in a case where the third step is carried out after the fourth step. In this manufacturing method, the adhesive for heat press molding having the more excellent dispersibility in an aggregation of small wooden pieces which are materials of the wooden board can be obtained.

In the manufacturing method of an adhesive for heat press molding according to the present embodiment, a dispersant is preferably further mixed in the first step. In this manufacturing method, the adhesive for heat press molding having the excellent dispersibility and the excellent handleability when pulverized can be obtained.

In a manufacturing method of a wooden board according to the present embodiment, the wooden board is obtained by mixing and heat press molding the adhesive for heat press molding which is obtained by the method of an adhesive for heat press molding and an aggregation of small wooden pieces. In this manufacturing method, the wooden board having the water resistancy high enough for practical use with little decrease in the bending strength can be obtained.

EXAMPLE

Hereinafter, the present embodiment is further explained in detail referring to examples, but the present embodiment is not limited to the examples. Note that amounts shown in the Table 1 are in weight %.

Examples 1 to 3

Citric acid (manufactured by Wako Pure Chemical Corporation) was used as a polycarboxylic acid and sucrose (manufactured by Wako Pure Chemical Corporation) was used as a saccharide. A mixture was obtained by mixing the ingredients at the amounts shown in the Table 1. Then, a heat treatment was carried out on the mixture at a temperature of 120° C. for 60 minutes, followed by addition of water to the reaction product to obtain a 65 weight % aqueous solution of an adhesive. Note that the 65 weight % aqueous solution means that an amount of the reaction product with respect to the total amount of the aqueous solution of the adhesive is 65 weight %.

Then, the obtained aqueous solution of the adhesive was sprayed on small wooden pieces (particle size of 500 μm or less), and the small wooden pieces were dried. After the small wooden pieces were air-dried, the small wooden pieces were heat press molded using a small heat press molding device at a temperature of 220° C. for 30 seconds, and thereby a wooden board with a thickness of 30 mm was obtained. The density of the wooden board was 750 kg/m$^3$ and the adhesive content was 20 weight %. Note that the adhesive content being 20 weight % means that an amount of the reaction production excluding water with respect to the total amount of the wooden board is 20 weight %.

Examples 4 to 8

The wooden boards of the examples 4 to 8 were obtained in the same manner as the wooden boards of the examples 1 to 3 except that ammonium sulfate (manufactured by Wako Pure Chemical Corporation) as a catalyst was also mixed in addition to the polycarboxylic acid and the saccharide.

Examples 9 to 11

The wooden boards of the examples 9 to 11 were obtained in the same manner as the wooden boards of the examples 4 to 8 except that ammonium chloride (manufactured by Wako Pure Chemical Corporation) was mixed as the catalyst.

Examples 12 to 19

Citric acid (manufactured by Wako Pure Chemical Corporation) was used as a polycarboxylic acid, sucrose (manufactured by Wako Pure Chemical Corporation) was used as a saccharide, paraffin WAX (manufactured by Wako Pure Chemical Corporation), polyethylene glycol (PEG: manufactured by Wako Pure Chemical Corporation), and polypropylene glycol (PPG: manufactured by Wako Pure Chemical Corporation) were used as a dispersant. A mixture was obtained by mixing the ingredients at the amounts shown in the Table 1. Then, a heat treatment was carried out on the mixture at a temperature of 230° C. for 60 minutes, and thereby a heat reaction product was obtained. The heat reaction product was then cooled, and citric acid (manufactured by Wako Pure Chemical Corporation), ammonium sulfate (manufactured by Wako Pure Chemical Corporation), ammonium chloride (manufactured by Wako Pure Chemical Corporation), and paratoluene sulfonic acid (PTSA: manufactured by Wako Pure Chemical Corporation) were added to the cooled heat reaction product at amounts shown in the Table 1. The obtained product was pulverized, and thereby a powderly heat reaction product was obtained.

Then, the obtained powderly heat reaction product was mixed with small wooden pieces (particle size of 500 μm or less), and the mixture was heat press molded using a small heat press molding device under a condition shown in the Table 2, and thereby a wooden board was obtained. The density of the wooden board was 750 kg/m$^3$ and the adhesive content was 20 weight %. Note that moldability of the wooden board was good in each of the examples 12 to 19.

<Evaluation>

[Bending Strength: IB]

The bending strength of the wooden board of each of the examples was measured, conforming to JISA5908:2003. Note that the measurements of the bending strength were carried out at a normal condition.

[Thickness Expansion Rate after Water Absorption: TS]

The thickness expansion rate after water absorption of each of the examples was measured, conforming to JISA5908:2003.

The results of the above evaluations are shown in the Table 2. Note that the bending strength is considered satisfactory at 0.3 MPa or more and the thickness expansion rate after water absorption is considered satisfactory at 30% or less and considered favorable at 20% or less.

From the above results, it was determined that by using the adhesive for heat press molding in which the mixture went through heat treatment, the wooden board having the excellent water resistance with little decrease in bending strength could be obtained.

TABLE 1

| | | Heating reaction product | | | | | | Additive (added afterwards) | | | | |
|---|---|---|---|---|---|---|---|---|---|---|---|---|
| | | Catalyst | | | Dispersant | | | Heating | | | | |
| Example | Main agent Sucrose | Citric acid | Ammonium sulfate | Ammonium chloride | Paraffin WAX | PEG | PPG | reaction product | Citric acid | Ammonium sulfate | Ammonium chloride | PTSA |
| 1 | 60 | 40 | | | | | | | | | | |
| 2 | 40 | 60 | | | | | | | | | | |
| 3 | 25 | 75 | | | | | | | | | | |
| 4 | 50 | 40 | 10 | | | | | | | | | |
| 5 | 40 | 48 | 12 | | | | | | | | | |
| 6 | 60 | 38 | 2 | | | | | | | | | |
| 7 | 60 | 35 | 5 | | | | | | | | | |
| 8 | 60 | 32 | 8 | | | | | | | | | |
| 9 | 60 | 38 | | 2 | | | | | | | | |
| 10 | 60 | 35 | | 5 | | | | | | | | |
| 11 | 60 | 32 | | 8 | | | | | | | | |
| 12 | 98 | 0.1 | | | 1 | | 1 | 75 | 25 | | | |
| 13 | 98 | 0.1 | | | 1 | | 1 | 75 | | 25 | | |
| 14 | 98 | 0.1 | | | 1 | | 1 | 75 | | | 25 | |
| 15 | 98 | 0.1 | | | 1 | | 1 | 95 | | | | 5 |
| 16 | 98 | 0.1 | | | 1 | | 1 | 75 | | | | 25 |
| 17 | 89 | 0.1 | 9 | | 0.9 | | 0.9 | 75 | | | 25 | |
| 18 | 98 | 0.1 | | | 1 | 1 | | 75 | | | 25 | |
| 19 | 99 | 0.1 | | | 1 | | | 75 | | | 25 | |

TABLE 2

| | Molding condition | | | Evaluation | |
|---|---|---|---|---|---|
| Example | Thickness (mm) | Temperature (° C.) | Time (s) | IB (MPa) | TS (%) |
| 1 | 3 | 220 | 30 | 0.9 | 16 |
| 2 | 3 | 220 | 30 | 0.9 | 19 |
| 3 | 3 | 220 | 30 | 0.9 | 17 |
| 4 | 3 | 220 | 30 | 1.2 | 15 |
| 5 | 3 | 220 | 30 | 1.1 | 18 |
| 6 | 3 | 220 | 30 | 1.5 | 12 |
| 7 | 3 | 220 | 30 | 0.9 | 11 |
| 8 | 3 | 220 | 30 | 1.4 | 11 |
| 9 | 3 | 220 | 30 | 1.1 | 12 |
| 10 | 3 | 220 | 30 | 1.2 | 11 |
| 11 | 3 | 220 | 30 | 1 | 10 |
| 12 | 3 | 220 | 15 | 0.5 | 30 |
| 13 | 3 | 220 | 15 | 0.4 | 25 |
| 14 | 3 | 220 | 15 | 0.6 | 20 |
| 15 | 3 | 220 | 15 | 0.4 | 20 |
| 16 | 1 | 110 | 60 | 0.3 | 25 |
| 17 | 3 | 220 | 15 | 0.6 | 18 |
| 18 | 3 | 220 | 15 | 0.5 | 18 |
| 19 | 3 | 220 | 15 | 0.3 | 20 |

As shown in the Table 2, the bending strength of the wooden board of each of the examples 1 to 19 after the heat treatment was satisfactory. Especially, the examples 6 to 11 in which at least one of ammonium sulfate and ammonium chloride was used as the catalyst were determined to have excellent thickness expansion rates after water absorption.

Also, the heat reaction products of the examples 12 to 19 in which citric acid, ammonium sulfate, ammonium chloride, or paratoluene sulfonic acid was added after the heat reaction product containing the dispersant was obtained were able to be in a powder form and had improved handleability. Also, the bending strength and the thickness expansion rate after water absorption of each of the examples 12 to 19 were determined satisfactory.

SUMMARY

The adhesive for heat press molding according to the first embodiment contains a reaction product obtained by heat treatment on a mixture containing a polycarboxylic acid and a saccharide.

In the first embodiment, when the adhesive for heat press molding is used to manufacture a wooden board, a water resistancy high enough for practical use without a decrease in bending strength of the wooden board can be achieved, and at the same time the adhesive is environment-friendly, can be manufactured by low cast, and has high reactivity and good handleability.

In the adhesive according to the second embodiment realized in combination with the first embodiment, the mixture further contains at least one of ammonium sulfate and ammonium chloride.

In the second embodiment, when the wooden board is manufactured, an ester reaction between a hydroxyl group in a small wooden piece which is a material of the wooden board and the polycarboxylic acid can be facilitated.

In the adhesive according to the third embodiment realized in combination with the first or the second embodiment, at least one of ammonium sulfate and ammonium chloride is added to the reaction product after the heat treatment.

In the third embodiment, the adhesive for heat press molding can be easily pulverized and the handleability of the adhesive for heat press molding can be improved.

In the adhesive according to the fourth embodiment realized in combination with any one of the first to the third embodiments, the adhesive further contains wood powder, and the adhesive is in a form of pulverized powder.

In the fourth embodiment, dispersibility of the adhesive in an aggregation of small wooden pieces which are materials of the wooden board can be improved.

In the adhesive according to the fifth embodiment realized in combination with any one of the first to the third embodiments, the adhesive is in a form of an aqueous solution.

In the fifth embodiment, the adhesive can be easily mixed with the aggregation of small wooden pieces which are adherends, and an organic solvent is not required, leading to high safety to human bodies.

In the adhesive according to the sixth embodiment realized in combination with any one of the first to the fifth embodiments, the mixture further contains a dispersant.

In the sixth embodiment, since the mixture contains the dispersant, the viscosity of the mixture during the reaction by heat treatment is lowered, which facilitates polymerization (dehydration condensation) and reduces stickiness of the product after the reaction. Due to this, when the adhesive for heat press molding is pulverized, the dispersibility of pulverized powder of the adhesive is improved, leading to the improved handleability of the adhesive.

In the adhesive according to the seventh embodiment realized in combination with the sixth embodiment, the dispersant is a wax or a polyether.

In the seventh embodiment, when the adhesive for heat press molding is pulverized, the dispersibility of pulverized powder is especially improved, and the handleability of the adhesive can be especially improved. At the same time, the bending strength of the wooden board can be improved.

In the adhesive according to the eight embodiment realized in combination with any one of the first to the seventh embodiments, the polycarboxylic acid is citric acid, and the saccharide is sucrose.

In the eighth embodiment, when the adhesive for heat press molding is used to manufacture a wooden board, the water resistancy high enough for practical use with little decrease in the bending strength of the wooden board can be achieved.

In a wooden board according to the ninth embodiment, the wooden board is obtained by heat press molding of a mixture containing the adhesive for heat press molding according to any one of the first to the eighth embodiment and an aggregation of small wooden pieces.

In the ninth embodiment, the water resistancy high enough for practical use with little decrease in the bending strength of the wooden board can be achieved.

A manufacturing method of an adhesive for heat press molding according to the tenth embodiment includes a first step and a second step. In the first step, a mixture is obtained by mixing a polycarboxylic acid and a saccharide. In the second step, a reaction product is obtained by heat treatment on the mixture. The first step and the second step are carried out in this order.

In the tenth embodiment, the adhesive for heat press molding which can be used to manufacture a wooden board having the water resistancy high enough for practical use with little decrease in the bending strength can be obtained.

In the manufacturing method of an adhesive for heat press molding according to the eleventh embodiment realized in combination with the tenth embodiment, at least one of ammonium sulfate and ammonium chloride is further mixed in the first step.

In the eleventh embodiment, the adhesive for heat press molding such that an ester reaction between a hydroxyl group in a small wooden piece which is a material of the wooden board and the polycarboxylic acid can be facilitated when the wooden board is manufactured can be obtained.

The manufacturing method of an adhesive for heat press molding according to the twelfth embodiment realized in combination with the tenth or the eleventh embodiment includes a third step. In the third step, at least one of ammonium sulfate and ammonium chloride is added to the reaction product. The third step is carried out after the second step.

In the twelfth embodiment, the adhesive for heat press molding can be easily pulverized and the handleability of the adhesive for heat press molding can be improved.

In the manufacturing method of an adhesive for heat press molding according to the thirteenth embodiment realized in combination with any one of the tenth to the twelfth embodiments, wood powder is further mixed in the first step.

In the thirteenth embodiment, the adhesive for heat press molding having the excellent dispersibility in an aggregation of small wooden pieces which are materials of the wooden board can be obtained.

The manufacturing method of an adhesive for heat press molding according to the fourteenth embodiment realized in combination with any one of the tenth to the twelfth embodiments includes a fourth step. In the fourth step, water is added. The fourth step is carried out after the second step.

In the fourteenth embodiment, the adhesive for heat press molding which can be easily mixed with the aggregation of small wooden pieces which are adherends without an organic solvent can be obtained.

The manufacturing method of an adhesive for heat press molding according to the fifteenth embodiment realized in combination with the fourteenth embodiment includes a fifth step. In the fifth step, the wood powder is added and water is evaporated. The fifth step is carried out after the third step or the fourth step.

In the fifteenth embodiment, the adhesive for heat press molding having the more excellent dispersibility in an aggregation of small wooden pieces which are materials of the wooden board can be obtained.

In the manufacturing method of an adhesive for heat press molding according to the sixteenth embodiment realized in combination with any one of the tenth to the fifteenth embodiments, a dispersant is further mixed in the first step.

In the sixteenth embodiment, the adhesive for heat press molding having the excellent dispersibility and the excellent handleability when pulverized can be obtained.

In a manufacturing method of a wooden board according to the seventeenth embodiment, the wooden board is obtained by mixing and heat press molding the adhesive for heat press molding which is obtained by the method of an adhesive for heat press molding according to any one of the tenth to the sixteenth embodiments and an aggregation of small wooden pieces.

In the seventeenth embodiment, the wooden board having the water resistancy high enough for practical use with little decrease in the bending strength can be obtained.

The invention claimed is:

1. A manufacturing method of an adhesive for heat press molding, comprising:
   a first step of obtaining a mixture by mixing a poly carboxylic acid and a saccharide;
   a second step of obtaining a reaction product by heat treatment on the mixture;
   a third step of adding at least one of ammonium sulfate and ammonium chloride to the reaction product;
   a fourth step of adding water; and
   a fifth step of adding wood powder and evaporating water, wherein
   the first step and the second step are carried out in this order,
   the third step is carried out after the second step,
   the fourth step is carried out after the second step, and the fifth step is carried out after the third step or the fourth step.

2. The manufacturing method of an adhesive for heat press molding according to claim 1, wherein at least one of ammonium sulfate and ammonium chloride is further mixed in the first step.

3. The manufacturing method of an adhesive for heat press molding according to claim 1, wherein a dispersant is further mixed in the first step.

* * * * *